United States Patent [19]
Butterfield et al.

[11] Patent Number: 5,172,659
[45] Date of Patent: Dec. 22, 1992

[54] DIFFERENTIAL PRESSURE CONTROL SYSTEM FOR VARIABLE CAMSHAFT TIMING SYSTEM

[75] Inventors: Roger P. Butterfield, Interlaken; Franklin P. Smith, Slaterville Springs, both of N.Y.

[73] Assignee: Borg-Warner Automotive Transmission & Engine Components Corporation, Sterling Heights, Mich.

[21] Appl. No.: 763,514

[22] Filed: Sep. 20, 1991

Related U.S. Application Data

[63] Continuation-in-part of Ser. No. 713,465, Jun. 11, 1991, Pat. No. 5,107,804, which is a continuation-in-part of Ser. No. 584,913, Sep. 19, 1990, Pat. No. 5,046,460, which is a continuation-in-part of Ser. No. 422,353, Oct. 16, 1989, Pat. No. 5,002,023.

[51] Int. Cl.⁵ .............................................. F01L 1/34
[52] U.S. Cl. .............................. 123/90.17; 123/90.31; 464/2
[58] Field of Search ............... 123/90.12, 90.15, 90.17, 123/90.31; 464/2

[56] References Cited

U.S. PATENT DOCUMENTS

| | | | |
|---|---|---|---|
| 4,858,572 | 8/1989 | Shirai et al. | 123/90.15 |
| 4,889,086 | 12/1989 | Scapecchi et al. | 123/90.15 |
| 4,903,650 | 2/1990 | Ohlendorf et al. | 123/90.17 |
| 5,002,023 | 3/1991 | Butterfield et al. | 123/90.15 |
| 5,012,773 | 5/1991 | Akasaka et al. | 123/90.17 |
| 5,046,460 | 6/1991 | Butterfield et al. | 123/90.15 |
| 5,056,477 | 10/1991 | Linder et al. | 123/90.17 |
| 5,056,478 | 10/1991 | Ma | 123/90.17 |
| 5,058,539 | 10/1991 | Saito et al. | 123/90.17 |
| 5,088,456 | 2/1992 | Suga | 123/90.17 |

FOREIGN PATENT DOCUMENTS

| | | | |
|---|---|---|---|
| 131808 | 6/1988 | Japan | 123/90.15 |
| 2120320 | 11/1983 | United Kingdom | 123/90.17 |

Primary Examiner—E. Rollins Cross
Assistant Examiner—Weilun Lo
Attorney, Agent, or Firm—Willian, Brinks, Olds, Hofer, Gibson & Lione

[57] ABSTRACT

A camshaft (126) has a vane (160) secured to an end thereof for non-oscillating rotation therewith. The camshaft tends to change in reaction to pulses which it experiences during its normal operation, and it is permitted to change only in a given direction, either to advance or retard, by selectively blocking or permitting the flow of hydraulic fluid, preferably engine oil, through the return lines (194, 196) from the recesses by controlling the position of a spool (200) within a valve body (198) of a control valve in response to a signal indicative of an engine operating condition from an engine control unit (208). The spool is selectively positioned within the valve body by controlling hydraulic loads on its opposed end, one end being subjected to full system pressure from the hydraulic source (230), the other end being subject to the action of an hydraulic pressure multiplier (234) which receives fluid from the hydraulic source by way of pulse width modulated solenoid (206) that acts to controllably reduce hydraulic system pressure in response to a signal from an engine control unit (208). The spool is centered when the hydraulic loads acting on its opposed ends are in balance by the action of springs (202, 204) that also act on the opposed ends of the spool.

15 Claims, 14 Drawing Sheets

DIFFERENTIAL PRESSURE CONTROL SYSTEM FOR VARIABLE CAMSHAFT TIMING SYSTEM

CROSS-REFERENCE TO RELATED APPLICATIONS

This application is a continuation-in-part of co-pending application Ser. No. 713,465 filed Jun. 11, 1991 now U.S. Pat. No. 5,107,804, which, in turn, is a continuation-in-part of co-pending application Ser. No. 584,913, filed Sept. 19, 1990 now U.S. Pat. No. 5,046,460, the disclosure of which is incorporated by reference herein. The aforesaid co-pending application Ser. No. 584,913, in turn, was a continuation-in-part of application Ser. No. 422,353 filed Oct. 16, 1988 which was co-pending therewith, now U.S. Pat. No. 5,002,023, the disclosure of which is also incorporated by reference herein.

FIELD OF THE INVENTION

This invention relates to an hydraulic control system for controlling the operation of a variable camshaft timing (VCT) system of the type in which the position of the camshaft is circumferentially varied relative to the position of a crankshaft in reaction to torque reversals experienced by the camshaft during its normal operation. In such a VCT system, an hydraulic system is provided to effect the repositioning of the camshaft in reaction to such torque reversals, and a control system is provided to selectively permit or prevent the hydraulic system from effecting such repositioning.

BACKGROUND OF THE INVENTION

The aforesaid U.S. Pat. No. 5,002,023 describes a VCT system within the field of the invention in which the system hydraulics includes a pair of oppositely acting hydraulic cylinders with appropriate hydraulic flow elements to selectively transfer hydraulic fluid from one of the cylinders to the other, or vice versa, to thereby advance or retard the circumferential position of a camshaft relative to a crankshaft. The aforesaid co-pending application Ser. No. 713,465 further describes a VCT system within the field of the invention in which the system hydraulics include a vane having lobes within an enclosed housing, the vane being oscillatable with respect to the housing, with appropriate hydraulic flow elements to transfer hydraulic fluid within the housing from one side of a lobe to the other, or vice versa, to thereby oscillate the vane with respect to the housing in one direction or the other, an action which is effective to advance or retard the position of the camshaft relative to the crankshaft. The control system for the VCT system of U.S. Pat. No. 5,002,023 utilizes a control valve in which the exhaustion of hydraulic fluid from one or another of the oppositely acting cylinders is permitted by moving a spool within the valve one way or another from its centered or null position. The movement of the spool occurs in response to an increase or decrease in control hydraulic pressure on an end of the spool and the relationship between the hydraulic force on such end and an oppositely directed mechanical force on the other end which results from a compression spring that acts thereon.

A problem with the control system of the aforesaid type is that it relies on an hydraulic force of variable magnitude to counteract a mechanical force. This problem arises from the fact that the pressure and viscosity of the hydraulic fluid that is used in the control system, illustratively engine lubricating oil in an automotive VCT application, can change over a period of time due to changes in the engine r.p.m., the operating temperature or age of the oil, or variations in the composition of the engine oil from time to time as a result of an oil change in which the old oil is replaced by an oil of a different brand or grade. In any case, in a control system of the aforesaid type the actual hydraulic control pressure, which is at least partly related to viscosity in a dynamic system, is maintained at a predetermined value by changing the duty cycle of a pulse width modulated (PWM) solenoid. The PWM solenoid, which is included in a control system of the aforesaid type, is used to control the hydraulic pressure at a reduced level from a higher pressure source, for example, the engine oil gallery, based on the duration of the "on" cycles of the PWM solenoid relative to its "off" cycles. Very sophisticated software is required to control the duty cycle of a PWM solenoid to prevent changes in engine oil pressure or viscosity from undesirably changing the desired centered or null position of the control valve spool.

SUMMARY OF THE INVENTION

The present invention provides an improved method and apparatus for controlling the position of a spool in an hydraulic control valve. Specifically, the present invention provides an improved method and apparatus for controlling the position of a spool in an hydraulic control valve in a VCT system, for example, an hydraulic control valve which is used in an oppositely-acting hydraulic cylinder VCT timing system of the type disclosed in U.S. Pat. No. 5,002,023, or an hydraulic control valve which is used in a vane-type VCT timing system of the type disclosed in U.S. Ser. No. 713,465.

The control system of the present invention utilizes hydraulic force on both ends of the spool, hydraulic force on one end resulting from directly applied hydraulic fluid from the engine oil gallery at full hydraulic pressure. The hydraulic force on the other end of the spool results from an hydraulic cylinder or other force multiplier which acts thereon in response to system hydraulic fluid at reduced pressure from a PWM solenoid. Because the force at each of the opposed ends of the spool is hydraulic in origin, based on the same hydraulic fluid, changes in pressure or viscosity of the hydraulic fluid will be self-negating, and will not affect the centered or null position of the spool.

Preferably, the force multiplier which acts on the other end of the spool will exactly double the force acting on the one end of the spool, assuming equal hydraulic pressures acting on each. This can be accomplished by providing the hydraulic force multiplier with a piston whose cross-sectional area is exactly double the cross-sectional area of the end of the spool which is acted on directly by system hydraulic pressure. In this way, the hydraulic forces acting on the spool will be exactly in balance when the hydraulic pressure within the force multiplier is exactly equal to one-half that of system hydraulic pressure. This operating condition is achieved with a PWM solenoid duty cycle of 50%, a desirable number because it permits equal increases and decreases in force at the force multiplier end of the spool, to thereby move the spool in one direction or the other by the same amount and at the same rate by increasing or decreasing the duty cycle of the PWM solenoid.

Accordingly, it is an object of the present invention to provide an improved method and apparatus for controlling the operation of an hydraulic control valve of the spool type. It is a further object of the present invention to provide an improved method and apparatus for controlling the operation of an hydraulic control valve of the spool type in an automotive variable camshaft timing system which utilizes oppositely acting, torque reversal reactive hydraulic means.

For a further understanding of the present invention and the objects thereof, attention is directed to the drawing and the following brief description thereof, to the detailed description of the preferred embodiment, and to the appended claims.

DETAILED DESCRIPTION OF THE PREFERRED EMBODIMENT

Figure 1:
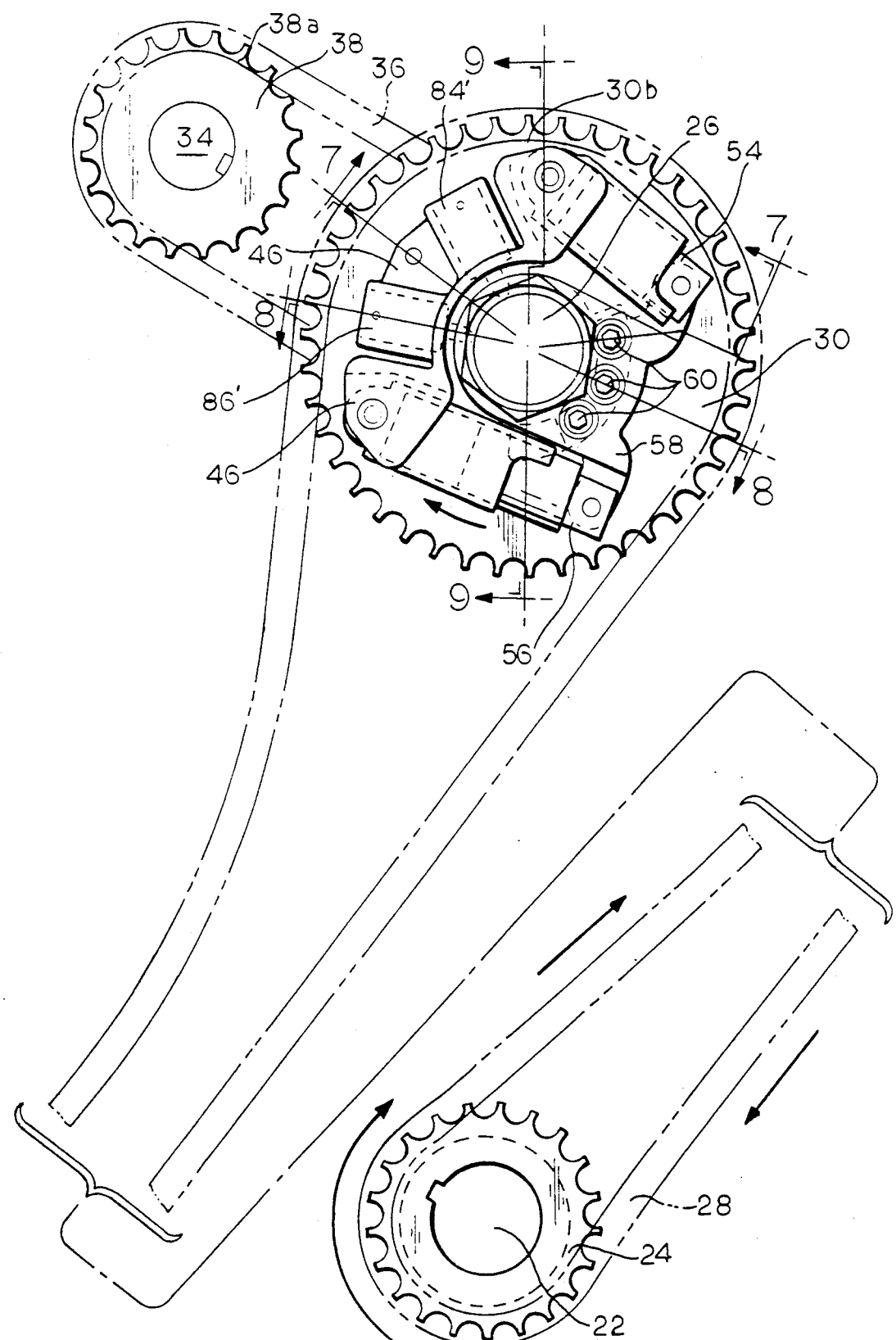
FIG. 1 is a fragmentary view of a dual camshaft internal combustion engine incorporating an embodiment of a variable camshaft timing arrangement according to the present invention, the view being taken on a plane extending transversely through the crankshaft and the camshafts and showing the intake camshaft in a retarded position relative to the crankshaft and the exhaust camshaft.

In the embodiment of FIGS. 1-9, a crankshaft 22 has a sprocket 24 keyed thereto, and rotation of the crankshaft 22 during the operation of the engine in which it is incorporated, otherwise not shown, is transmitted to an exhaust camshaft 26, that is, a camshaft which is used to operate the exhaust valves of the engine, by a chain 28 which is trained around the sprocket 24 and a sprocket 30 which is keyed to the camshaft 26. Although not shown, it is to be understood that suitable chain tighteners will be provided to ensure that the chain 28 is kept tight and relatively free of slack. As shown, the sprocket 30 is twice as large as the sprocket 24. This relationship results in a rotation of the camshaft 26 at a rate of one-half that of the crankshaft 22, which is proper for a 4-cycle engine. It is to be understood that the use of a belt in place of the chain 28 is also contemplated.

Figure 6:
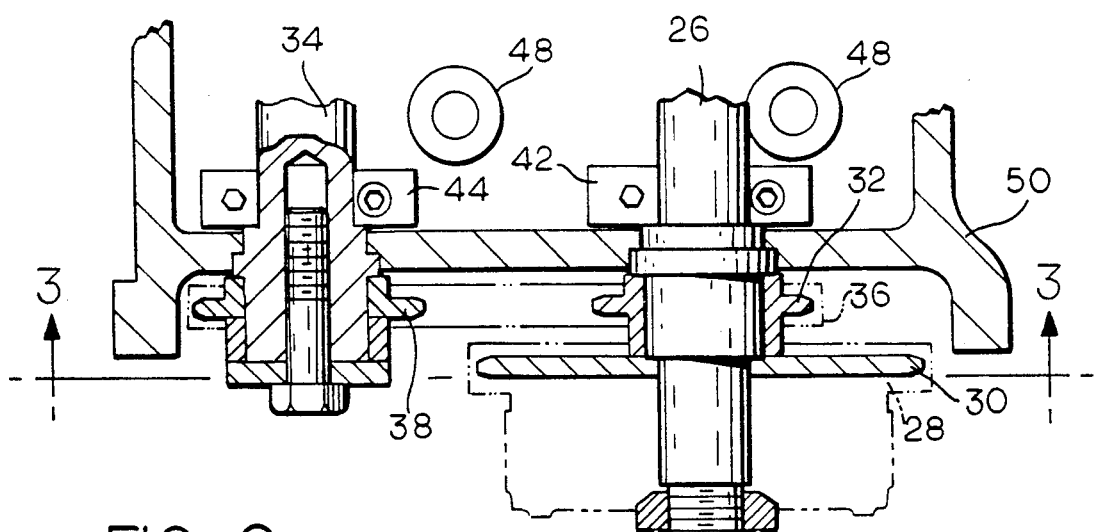
FIG. 6 is a fragmentary view taken on line 6—6 of FIG. 4.
Figure 3:
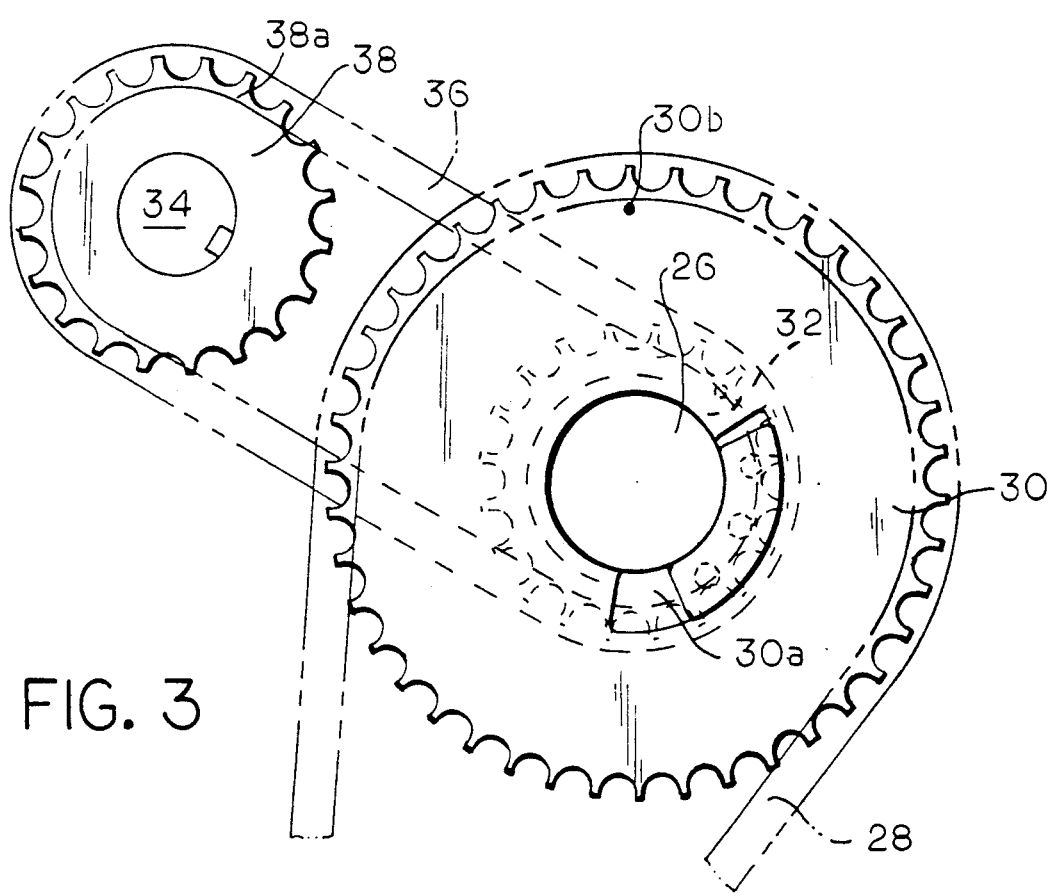
FIG. 3 is a fragmentary view taken on line 3—3 of FIG. 6 with some of the structure being removed for the sake of clarity and being shown in the retarded position of the device.
Figure 5:
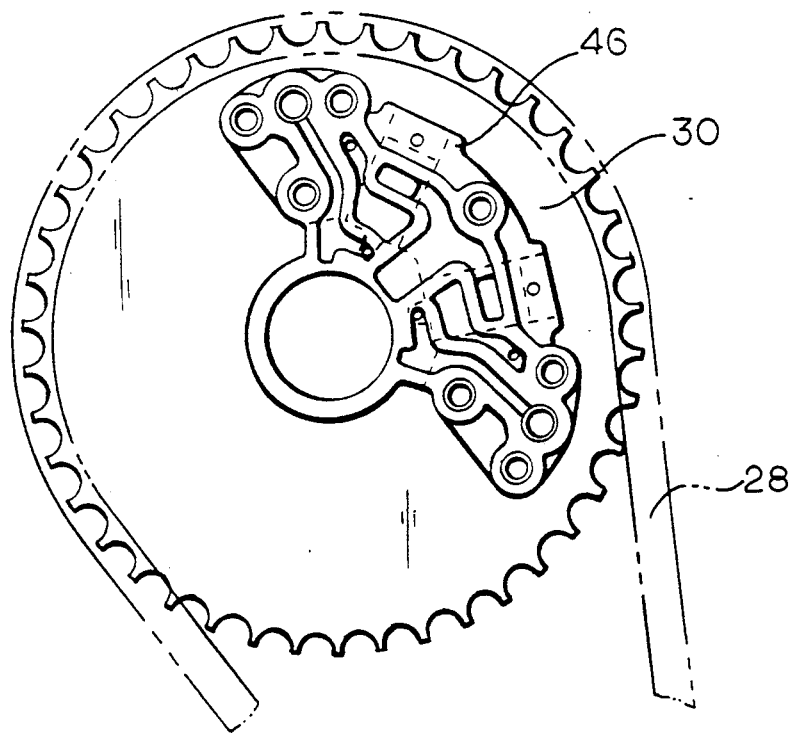
FIG. 5 is a fragmentary view showing the reverse side of some of the structure illustrated in FIG. 1.
Figure 4:
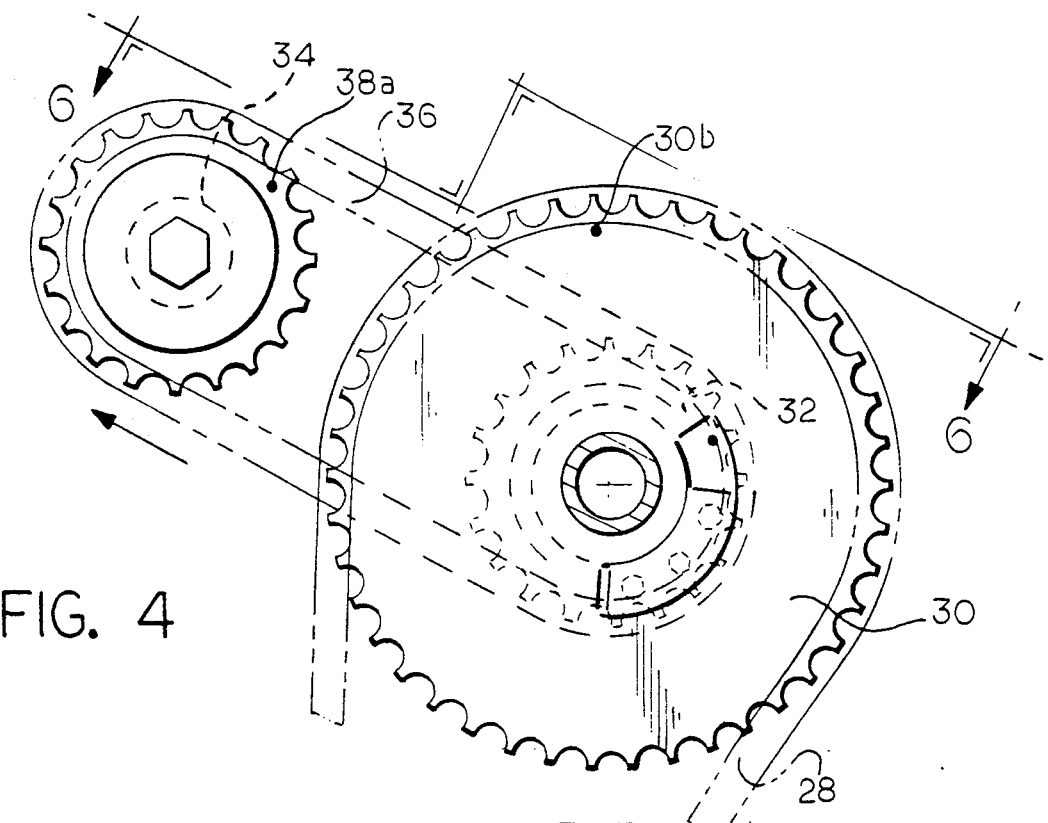
FIG. 4 is a fragmentary view similar to FIG. 3 showing the intake camshaft in an advanced position relative to the exhaust camshaft.
Figure 9:
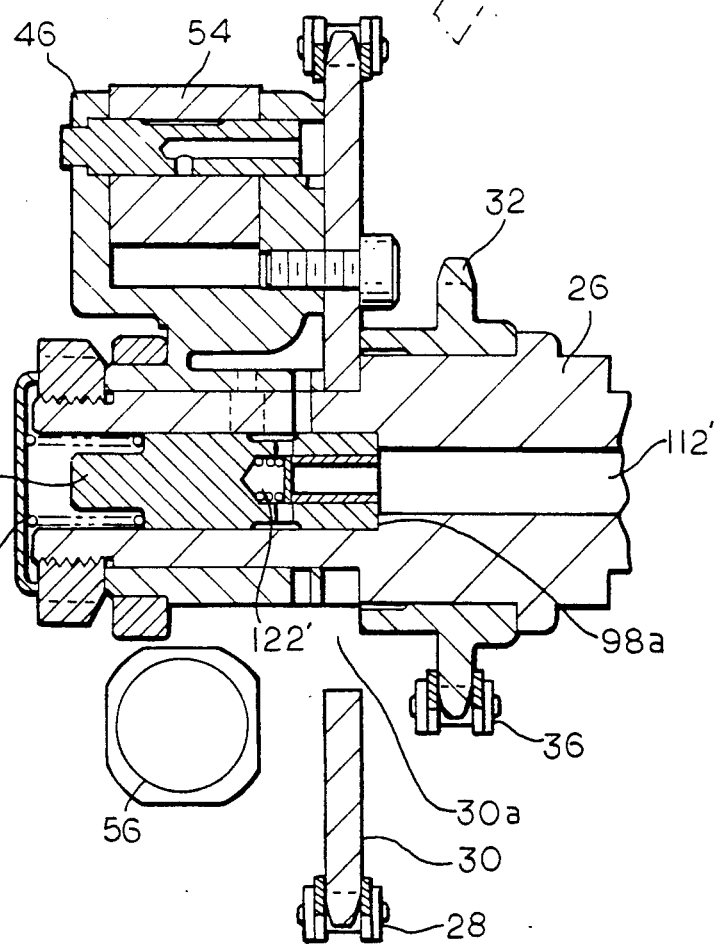
FIG. 9 is a sectional view taken on line 9—9 of FIG. 3.
Figure 7:
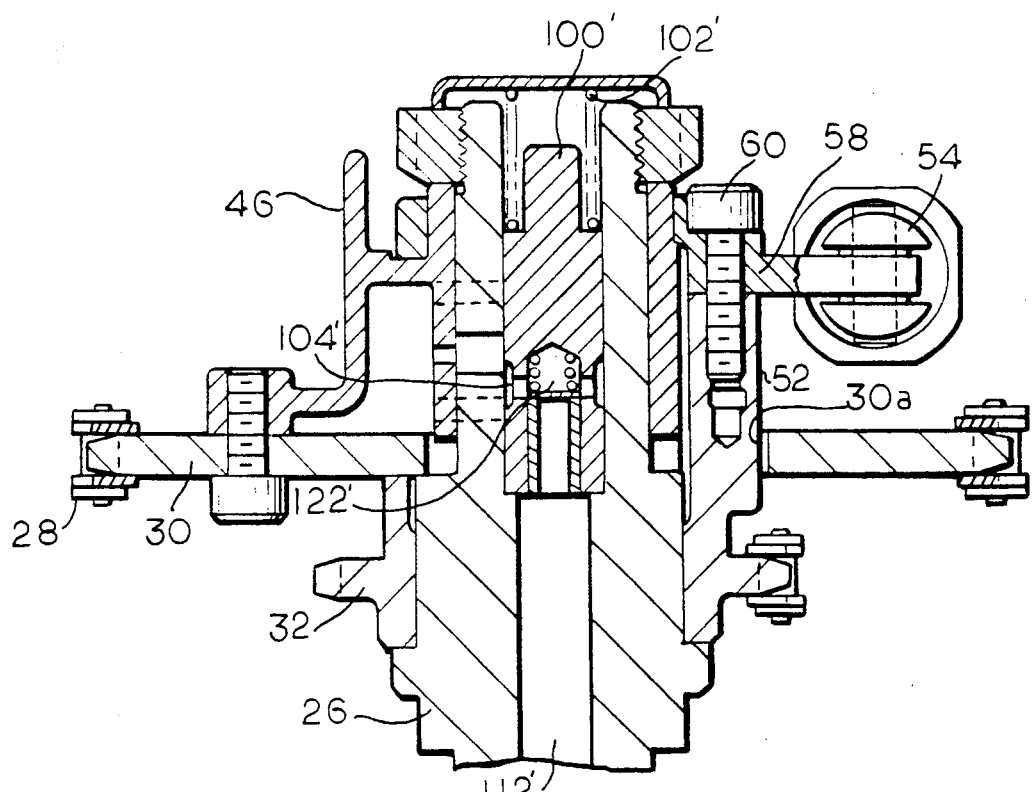
FIG. 7 is a fragmentary view taken on line 7—7 of FIG. 1.
Figure 8:
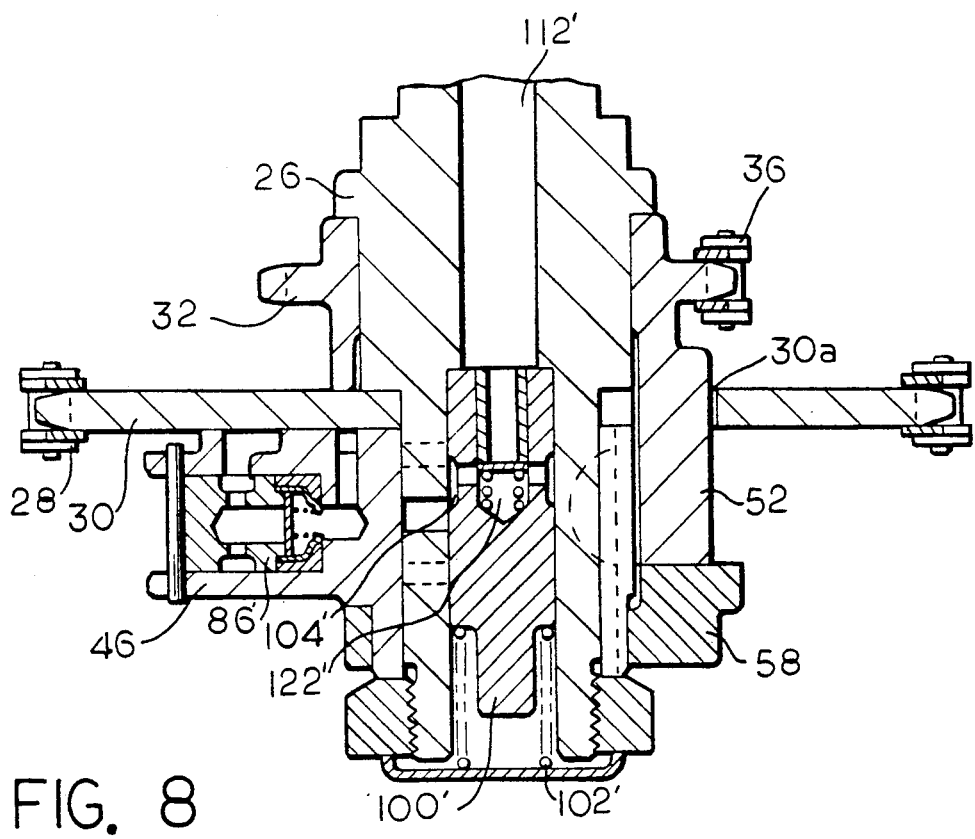
FIG. 8 is a sectional view taken on line 8—8 of FIG. 1.
Figure 10:
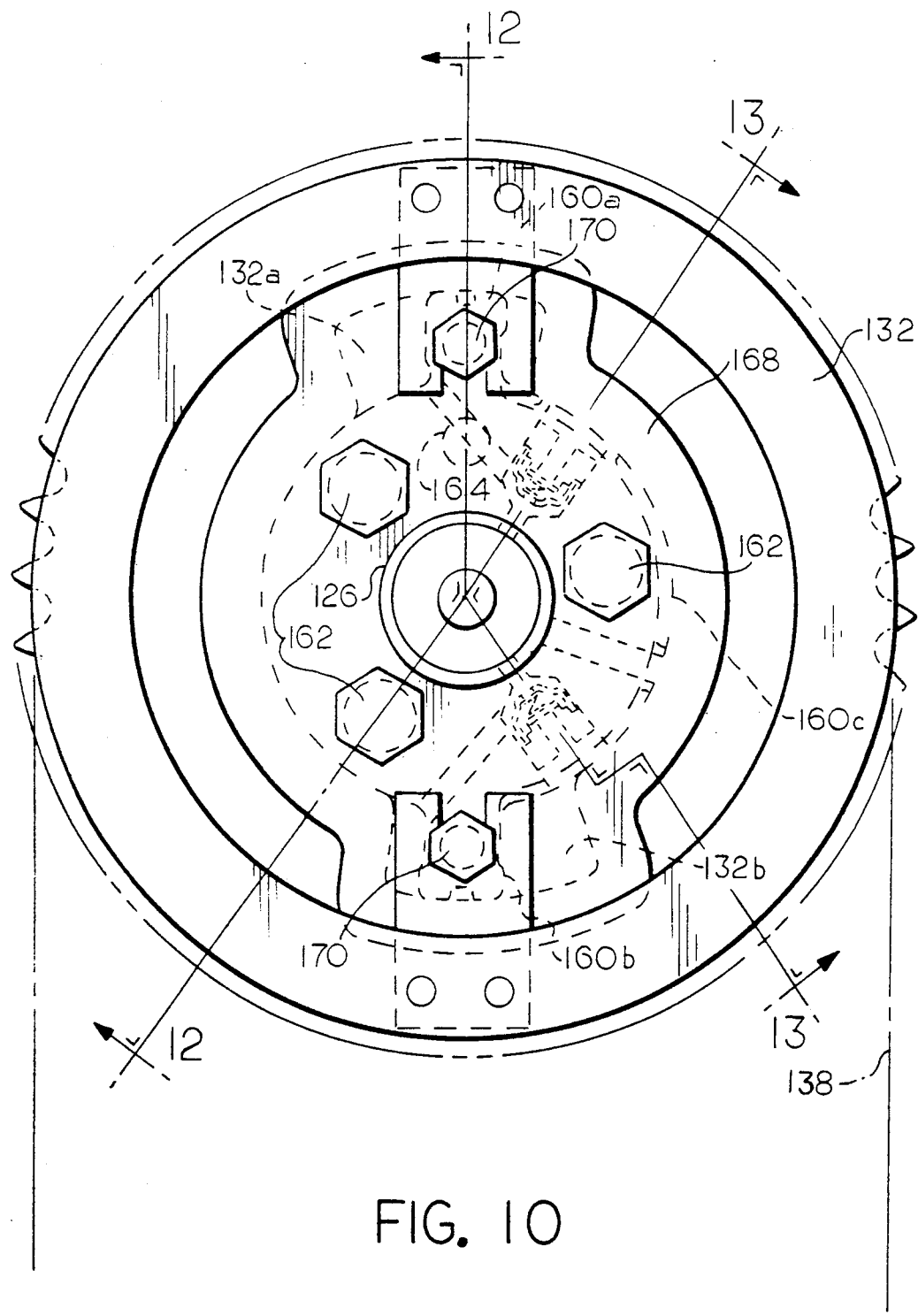
FIG. 10 is an end elevational view of a camshaft with an alternative embodiment of a variable camshaft timing system applied thereto.
Figure 11:
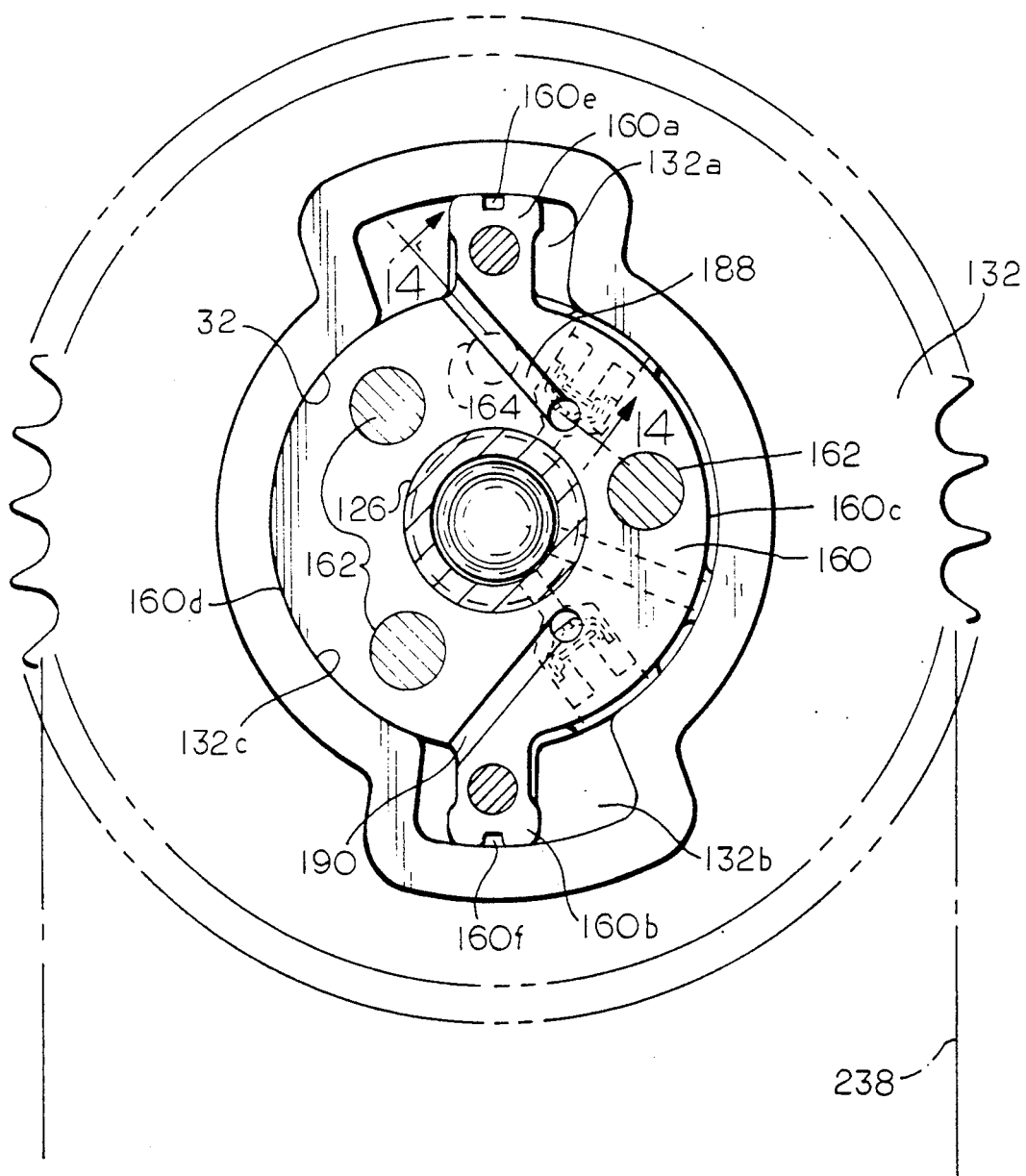
FIG. 11 is a view similar to FIG. 10 with a portion of the structure thereof removed to more clearly illustrate other portions thereof.

The camshaft 26 carries another sprocket, namely sprocket 32, FIG. 3, 4 and 6, journalled thereon to be oscillatable through a limited arc with respect thereto and to be otherwise rotatable with the camshaft 26. Rotation of the camshaft 26 is transmitted to an intake camshaft 34 by a chain 36 which is trained around the sprocket 32 and a sprocket 38 that is keyed to the intake camshaft 34. As shown, the sprockets 32 and 38 are equal in diameter to provide for equivalent rates of rotation between the camshaft 26 and the camshaft 34. The use of a belt in place of the chain 36 is also contemplated.

As is illustrated in FIG. 6, an end of each of the camshafts 26 and 34 is journalled for rotation in bearings 42 and 44, respectively, of the head 50, which is shown fragmentarily and which is bolted to an engine block, otherwise not shown, by bolts 48. The opposite ends of the camshafts 26 and 34, not shown, are similarly journalled for rotation in an opposite end, also not shown, of the head 50. The sprocket 38 is keyed to the camshaft 34 at a location of the camshaft 34 which is outwardly of the head 50. Similarly, the sprockets 32 and 30 are positioned, in series, on the camshaft 26 at locations outwardly of the head 50, the sprocket 32 being transversely aligned with the sprocket 38 and the sprocket 30 being positioned slightly outwardly of the sprocket 32, to be transversely aligned with the sprocket 24.

Figure 2:
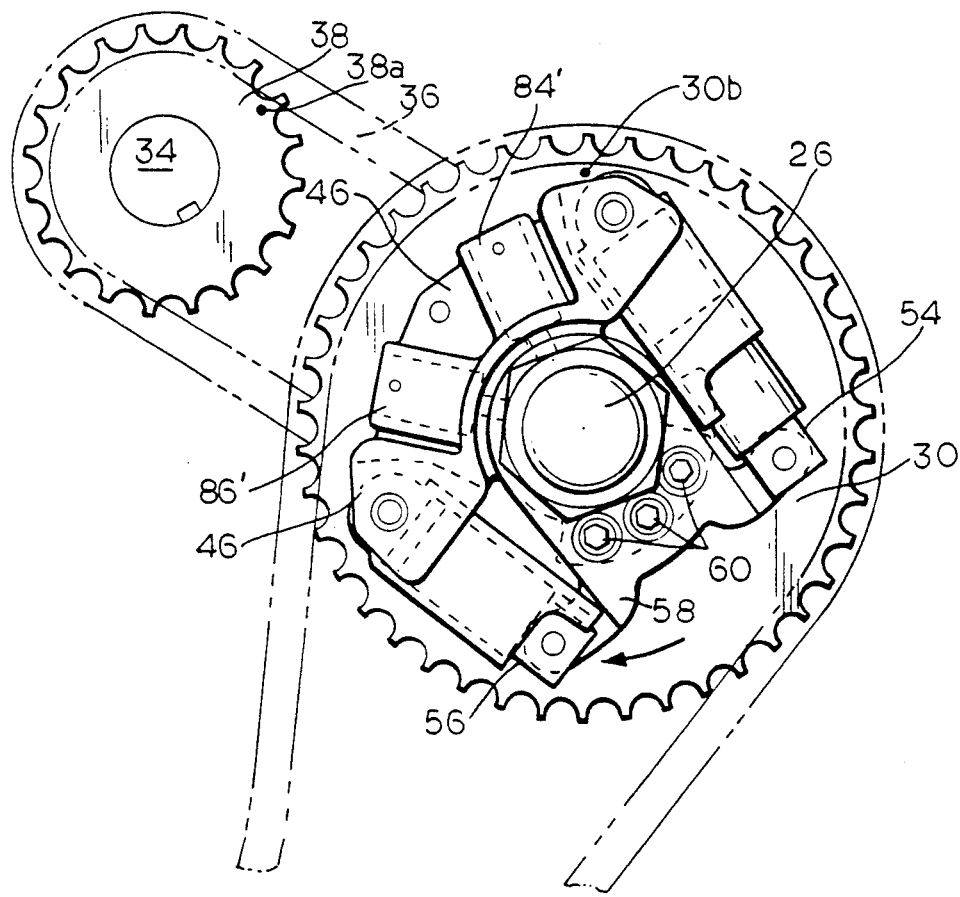
FIG. 2 is a fragmentary view similar to a portion of FIG. 1 showing the intake camshaft in an advanced position relative to the exhaust camshaft.

The sprocket 32 has an arcuate retainer 52 (FIGS. 7 and 8) as an integral part thereof, and the retainer 52 extends outwardly from the sprocket 32 through an arcuate opening 30a in the sprocket 30. The sprocket 30 has an arcuate hydraulic body 46 bolted thereto and the hydraulic body 46, which houses certain of the hydraulic components of the associated hydraulic control system, receives and pivotably supports the body end of each of a pair of oppositely acting, single acting hydraulic cylinders 54 and 56 which are positioned on opposite sides of the longitudinal axis of the camshaft 26. The piston ends of the cylinders 54 and 56 are pivotally attached to an arcuate bracket 58, and the bracket 58 is secured to the sprocket 32 by a plurality of threaded fasteners 60. Thus, by extending one of the cylinders 54 and 56 and by simultaneously retracting the other of the cylinders 54 and 56, the arcuate position of the sprocket 32 will be changed relative to the sprocket 30, either to advance the sprocket 32 if the cylinder 54 is extended and the cylinder 56 is retracted, which is the operating condition illustrated in FIGS. 2 and 4, or to retard the sprocket 32 relative to the sprocket 30 if the cylinder 56 is extended and the cylinder 54 is retracted, which is the operating condition illustrated in FIGS. 1, 3, 7 and 8. In either case, the retarding or advancing of the position of the sprocket 32 relative to the position of the sprocket 30, which is selectively permitted or prevented in reaction to the direction of torque in the camshaft 26, as explained in the aforesaid U.S. Pat. No. 5,002,023, will advance or retard the position of the camshaft 34 relative to the position of the camshaft 26 by virtue of the chain drive connection provided by the chain 36 between the sprocket 32, which is journalled for limited relative arcuate movement on the camshaft 26, and the sprocket 38, which is keyed to the camshaft 34. This relationship can be seen in the drawing by comparing the relative position of a timing mark 30b on the sprocket 30 and a timing mark 38a on the sprocket 38 in the retard position of the camshaft 34, as is shown in FIGS. 1 and 3, to their relative positions in the advanced position of the camshaft 34, as is shown in FIGS. 2 and 4.

FIGS. 10-19 illustrate an embodiment of the present invention in which a housing in the form of a sprocket 132 is oscillatingly journalled on a camshaft 126. The camshaft 126 may be considered to be the only camshaft of a single camshaft engine, either of the overhead camshaft type or the in block camshaft type. Alternatively, the camshaft 126 may be considered to be either the intake valve operating camshaft or the exhaust valve operating camshaft of a dual camshaft engine. In any case, the sprocket 132 and the camshaft 126 are rotatable together, and are caused to rotate by the application of torque to the sprocket 132 by an endless roller chain 138, shown fragmentarily, which is trained around the sprocket 132 and also around a crankshaft, not shown. As will be hereinafter described in greater detail, the sprocket 132 is oscillatingly journalled on the camshaft 126 so that it is oscillatable at least through a limited arc with respect to the camshaft 126 during the rotation of the camshaft, an action which will adjust the phase of the camshaft 126 relative to the crankshaft.

An annular pumping vane 160 is fixedly positioned on the camshaft 126, the vane 160 having a diametrically opposed pair of radially outwardly projecting lobes 160a, 160b and being attached to an enlarged end portion 126a of the camshaft 126 by bolts 162 which pass through the vane 160 into the end portion 126a. In that regard, the camshaft 126 is also provided with a thrust shoulder 126b to permit the camshaft to be accurately positioned relative to an associated engine block, not shown. The pumping vane 160 is also precisely positioned relative to the end portion 126a by a dowel pin 164 which extends therebetween. The lobes 160a, 160b are received in radially outwardly projecting recesses 132a, 132b, respectively, of the sprocket 132, the circumferential extent of each of the recesses 132a, 132b being somewhat greater than the circumferential extent of the vane lobe 160a, 160b which is received in such recess to permit limited oscillating movement of the sprocket 132 relative to the vane 160. The recesses 132a, 132b are closed around the lobes 160a, 160b, respectively, by spaced apart, transversely extending annular plates 166, 168 which are fixed relative to the vane 160, and, thus, relative to the camshaft 126, by bolts 170 which extend from one to the other through the same lobe, 160a, 160b. Further, the inside diameter 132c of the sprocket 132 is sealed with respect to the outside diameter of the portion 160d of the vane 160 which is between the lobes 160a, 160b, and the tips of the lobes 160a, 160b of the vane 160 are provided with seal receiving slots 160e, 160f, respectively. Thus each of the recesses 132a, 132b of the sprocket 132 is capable of sustaining hydraulic pressure, and within each recess 132a, 132b, the portion on each side of the lobe 160a, 160b, respectively, is capable of sustaining hydraulic pressure.

Figure 19:
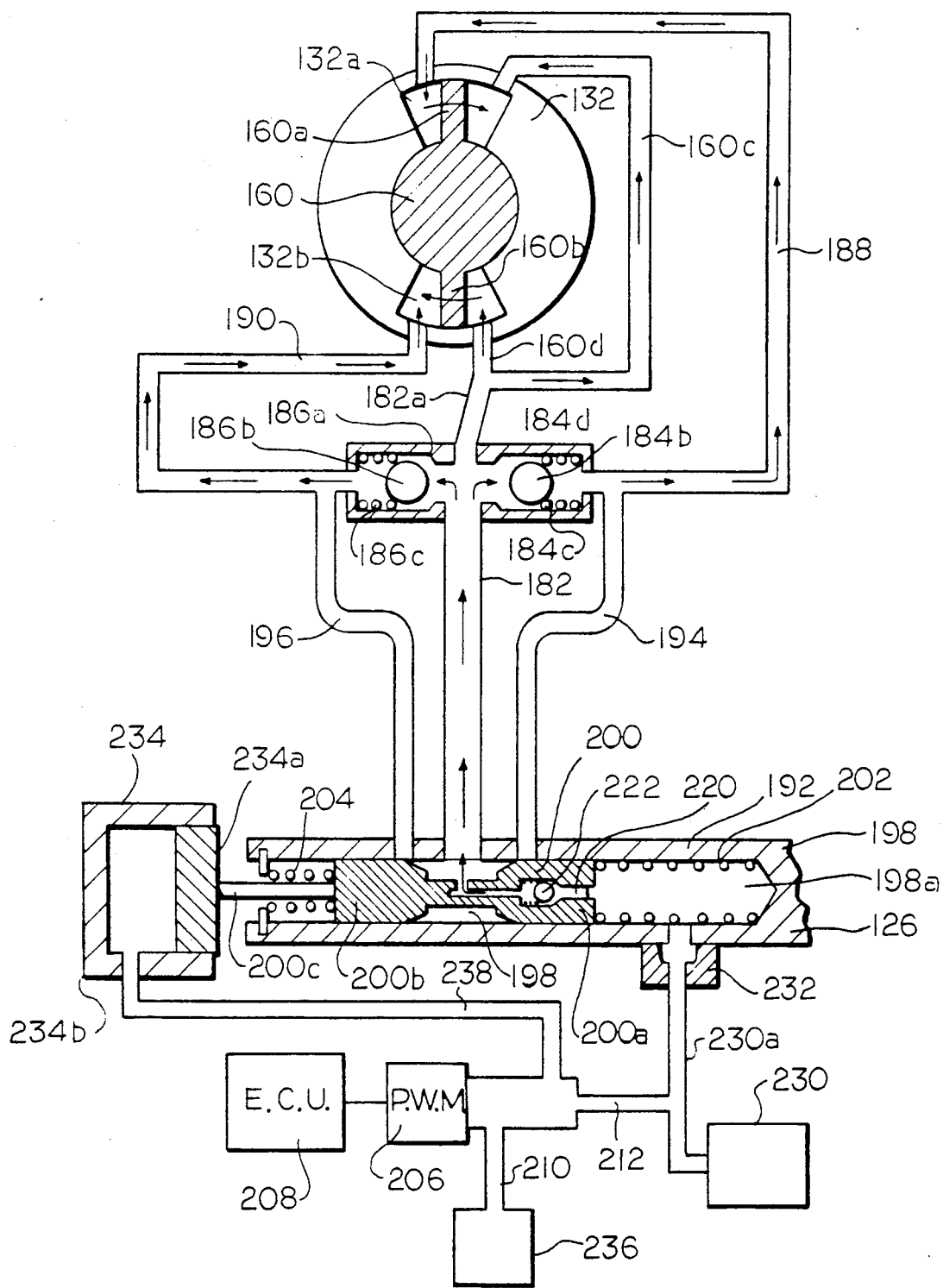
FIG. 19 is a simplified schematic view of the variable camshaft timing arrangement of FIGS. 10-18.

The functioning of the structure of the embodiment of FIGS. 10-18, as thus far described, may be understood by reference to FIG. 19. It also is to be understood, however, that the hydraulic control system of FIG. 19 is also applicable to an opposed hydraulic cylinder VCT system corresponding to the embodiment of FIGS. 1-9, as well as to a vane type VCT system corresponding to the embodiment of FIGS. 10-18.

In any case, hydraulic fluid, illustratively in the form of engine lubricating oil, flows into the recesses 132a, 132b by way of a common inlet line 182. The inlet line 182 terminates at a juncture between opposed check valves 184 and 186 which are connected to the recesses 132a, 132b, respectively, by branch lines 188, 190, respectively. The check valves 184, 186 have annular seats 184a, 186a, respectively, to permit the flow of hydraulic fluid through the check valves 184, 186 into the recesses 132a, 132b, respectively. The flow of hydraulic fluid through the check valves 184, 186 is blocked by floating balls 184b, 186b, respectively, which are resiliently urged against the seats 184a, 186a, respectively, by springs 184c, 186c, respectively. The check valves 184, 186, thus, permit the initial filling of the recesses 132a, 132b and provide for a continuous supply of make-up hydraulic fluid to compensate for leakage therefrom. Hydraulic fluid enters the line 182 by way of a spool valve 192, which is incorporated within the camshaft 126, and hydraulic fluid is returned to the spool valve 192 from the recesses 132a, 132b by return lines 194, 196, respectively.

The spool valve 192 is made up of a cylindrical member 198 and a spool 200 which is slidable to and fro within the member 198. The spool 200 has cylindrical lands 200a and 200b on opposed ends thereof, and the lands 200a and 200b, which fit snugly within the member 198, are positioned so that the land 200b will block the exit of hydraulic fluid from the return line 196, or the land 200a will block the exit of hydraulic fluid from the return line 194, or the lands 200a and 200b will block the exit of hydraulic fluid from both the return lines 194 and 196, as is shown in FIG. 19, where the camshaft 126 is being maintained in a selected intermediate position relative to the crankshaft of the associated engine.

The position of the spool 200 within the member 198 is influenced by an opposed pair of springs 202, 204 which act on the ends of the lands 200a, 200b, respectively. Thus, the spring 202 resiliently urges the spool 200 to the left, in the orientation illustrated in FIG. 19, and the spring 204 resiliently urges the spool 200 to the right in such orientation. The position of the spool 200 within the member 198 is further influenced by a supply of pressurized hydraulic fluid within a portion 198a of the member 198, on the outside of the land 200a, which urges the spool 200 to the left. The portion 198a of the member 198 receives its pressurized fluid (engine oil) directly from the main oil gallery ("MOG") 230 of the engine by way of a conduit 230a, and this oil is also used to lubricate a bearing 232 in which the camshaft 126 of the engine rotates.

The control of the position of the spool 200 within the member 198 is in response to hydraulic pressure within a control pressure cylinder 234 whose piston 234a bears against an extension 200c of the spool 200. The surface area of the piston 234a is greater than the surface area of the end of the spool 200 which is exposed to hydraulic pressure within the portion 198, and is preferably twice as great. Thus, the hydraulic pressures which act in opposite directions on the spool 200 will be in balance when the pressure within the cylinder 234 is one-half that of the pressure within the portion 198a, assuming that the surface area of the piston 234a is twice that of the end of the land 200a of the spool. This facilitates the control of the position of the spool 200 in that, if the springs 202 and 204 are balanced, the spool 200 will remain in its null or centered position, as illustrated in FIG. 19, with less than full engine oil pressure in the cylinder 234, thus allowing the spool 200 to be moved in either direction by increasing or decreasing the pressure in the cylinder 234, as the case may be. Further, the operation of the springs 202, 204 will ensure the return of the spool 200 to its null or centered position when the hydraulic loads on the ends of the lands 200a, 200b come into balance. While the use of springs such as the springs 202, 204 is preferred in the centering of the spool 200 within the member 198, it is also contemplated that electromagnetic or electrooptical centering means can be employed, if desired.

Figure 12:
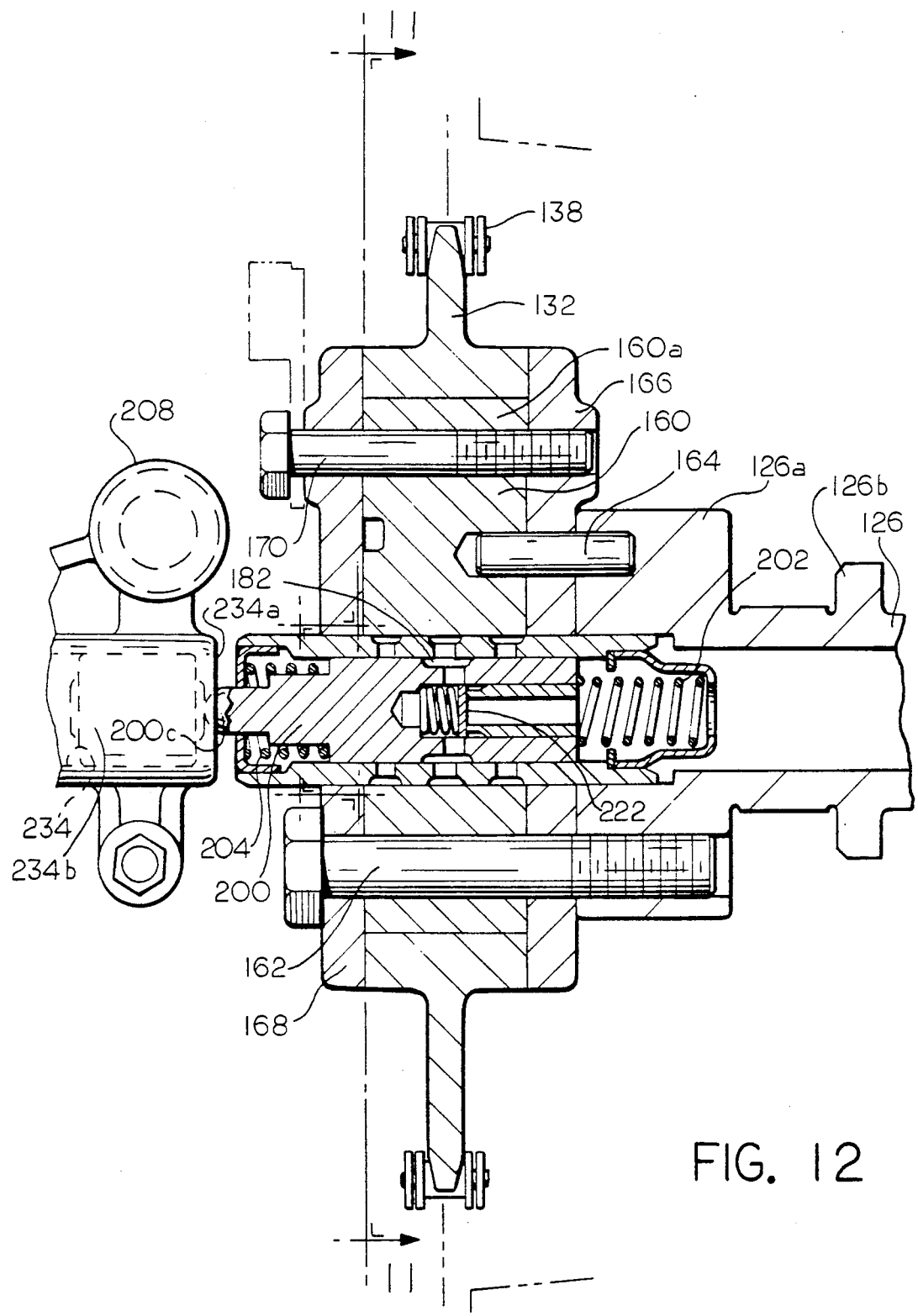
FIG. 12 is a sectional view taken on line 12—12 of FIG. 10.
Figure 13:
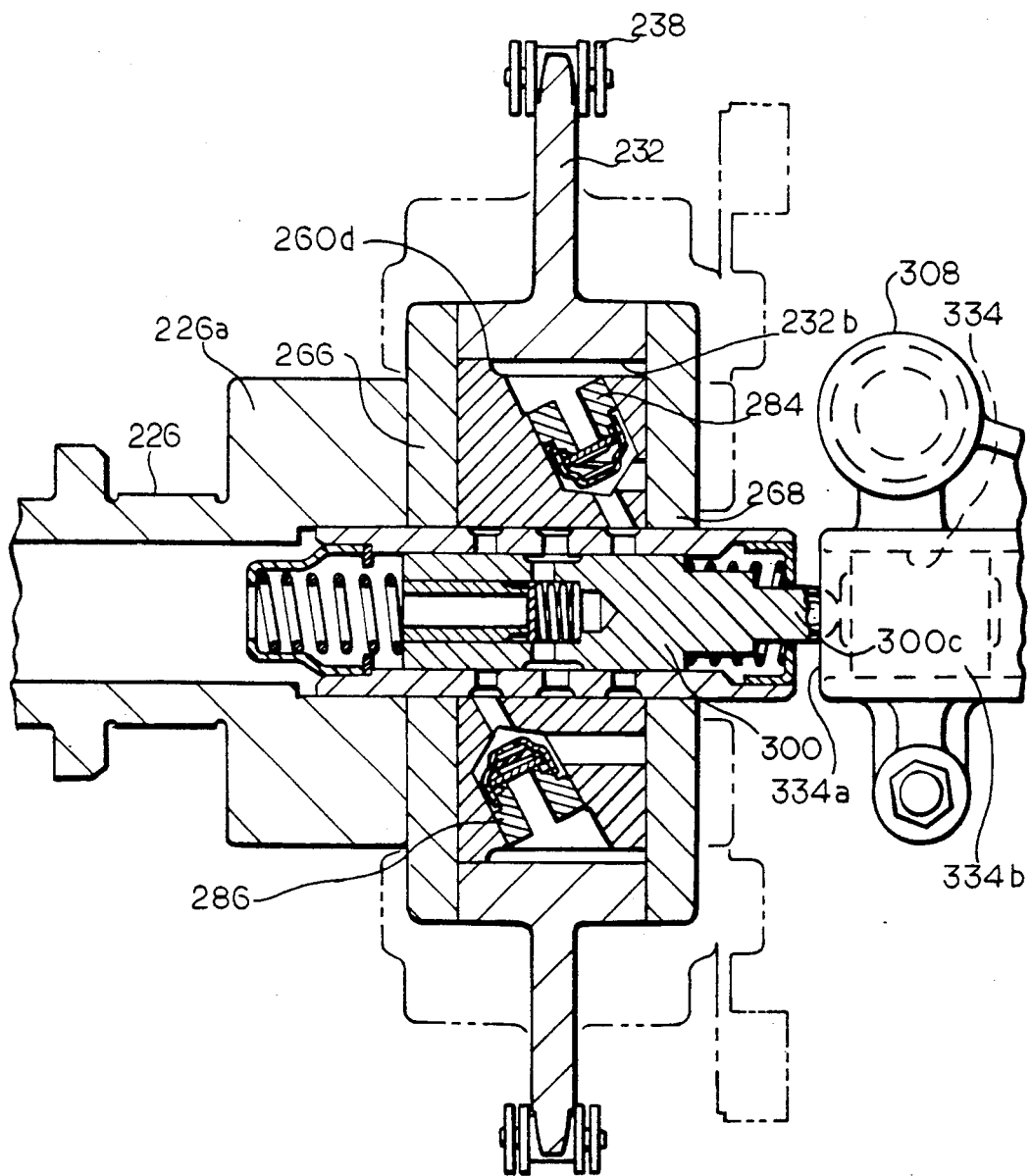
FIG. 13 is a sectional view taken on line 13—13 of FIG. 10.
Figures 15, 16:
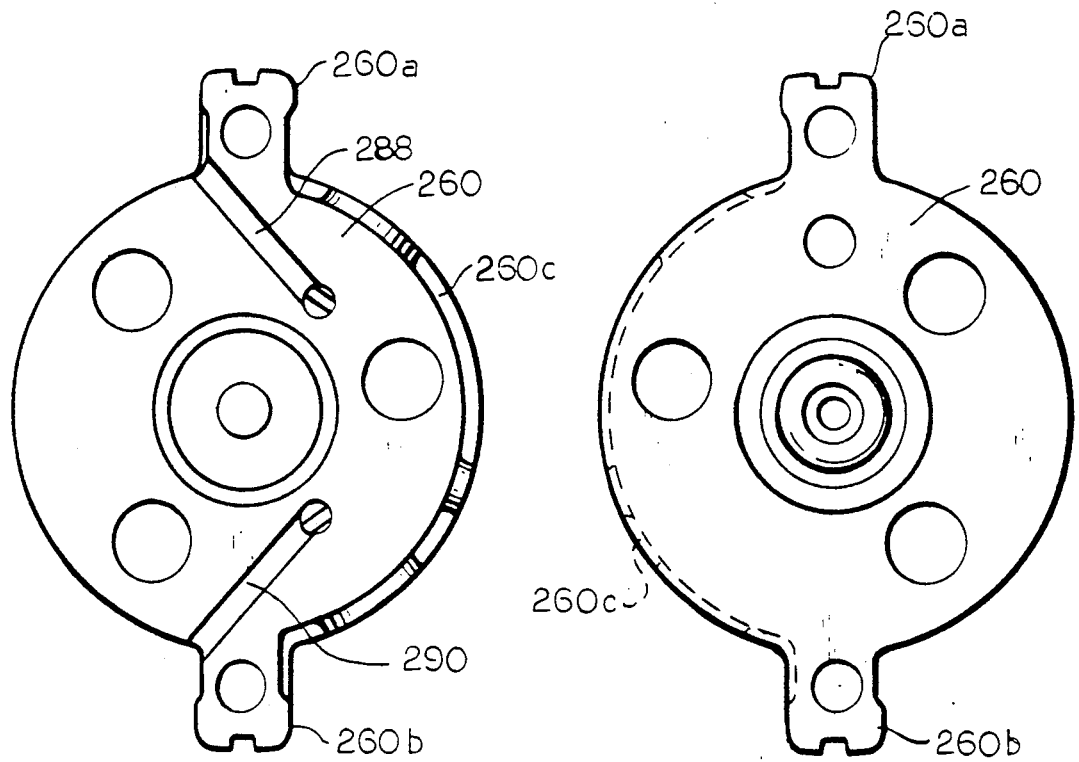
FIG. 15 is an end elevational view of an element of the variable camshaft timing system of FIGS. 10-14.
FIG. 16 is an elevational view of the element of FIG. 15 from the opposite end thereof.
Figure 14:
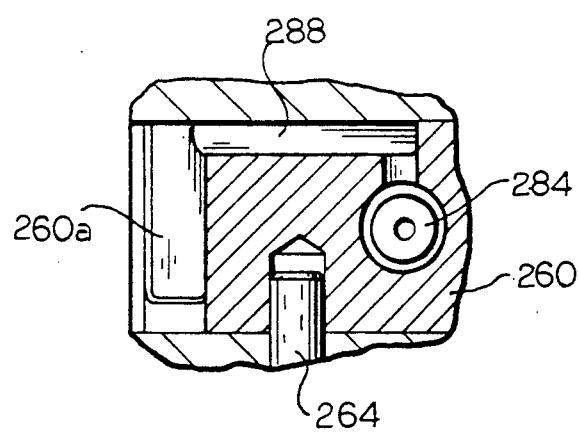
FIG. 14 is a sectional view taken on line 14—14 of FIG. 11.
Figure 17:
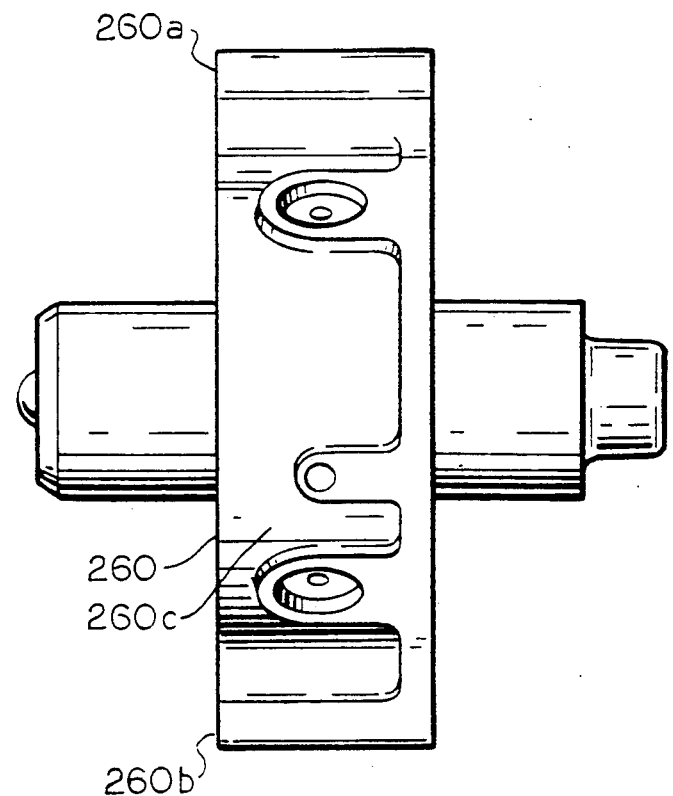
FIG. 17 is a side elevational view of the element of FIGS. 15 and 16.
Figure 18:
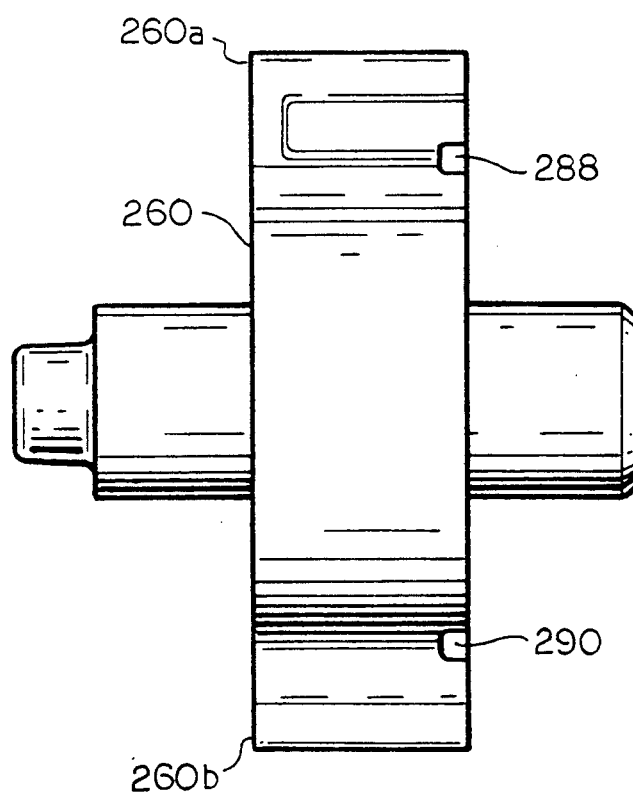
FIG. 18 is an elevational view of the element of FIG. 17 from the opposite side thereof.

The pressure within the cylinder 234 is controlled by a solenoid 206, preferably of the pulse width modulated type (PWM), in response to a control signal from an electronic engine control unit (ECU) 208, shown schematically, which may be of conventional construction. With the spool 200 in its null position when the pressure in the cylinder 234 is equal to one-half the pressure in the portion 198a, as heretofore described, the on-off pulses of the solenoid 206 will be of equal duration; by increasing or decreasing the on duration relative to the off duration, the pressure in the cylinder 234 will be increased or decreased relative to such one-half level, thereby moving the spool 200 to the right or to the left, respectively. The solenoid 206 receives engine oil from the engine oil gallery 230 through an inlet line 212 and selectively delivers engine oil from such source to the cylinder 234 through a supply line 238. Excess oil from the solenoid 206 is drained to a sump 236 by way of a line 210. As is shown in FIGS. 12 and 13, the cylinder 234 may be mounted at an exposed end of the camshaft 126 so that the piston 234a bears against an exposed free end 200c of the spool 200. In this case, the solenoid 208 is preferably mounted in a housing 234b which also houses the cylinder 234a.

By using imbalances between oppositely acting hydraulic loads from a common hydraulic source on the opposed ends of the spool 200 to move it in one direction or another, as opposed to using imbalances between an hydraulic load on one end and a mechanical load on an opposed end, the control system of FIG. 19 is capable of operating independently of variations in the viscosity or pressure of the hydraulic system. Thus, it is not necessary to vary the duty cycle of the solenoid 208 to maintain the spool 200 in any given position, for example, in its centered or null position, as the viscosity or pressure of the hydraulic fluid changes during the operation of the system. In that regard, it is to be understood that the centered or null position of the spool 200 is the position where no change in camshaft to crankshaft phase angle is occurring, and it is important to be able to rapidly and reliably position the spool 200 in its null position for proper operation of a VCT system.

Make-up oil for the recesses 132a, 132b of the sprocket 132 to compensate for leakage therefrom is provided by way of a small, internal passage 220 within the spool 200, from the passage 198a to an annular space 198b of the cylindrical member 198, from which it can flow into the inlet line 182. A check valve 222 is positioned within the passage 220 to block the flow of oil from the annular space 198b to the portion 198a of the cylindrical member 198.

The vane 160 is alternatingly urged in clockwise and counterclockwise directions by the torque pulsations in the camshaft 126 and these torque pulsations tend to oscillate the vane 160, and, thus, the camshaft 126, relative to the sprocket 132. However, in the FIG. 19 position of the spool 200 within the cylindrical member 198, such oscillation is prevented by the hydraulic fluid within the recesses 132a, 132b of the sprocket 132 on opposite sides of the lobes 160a, 160b, respectively, of the vane 160, because no hydraulic fluid can leave either of the recesses 132a, 132b, since both return lines 194, 196 are blocked by the position of the spool 200, in the FIG. 19 condition of the system. If, for example, it is desired to permit the camshaft 126 and vane 160 to move in a counterclockwise direction with respect to the sprocket 132, it is only necessary to increase the pressure within the cylinder 134 to a level greater than one-half that in the portion 198a of the cylindrical member. This will urge the spool 200 to the right and thereby unblock the return line 194. In this condition of the apparatus, counterclockwise torque pulsations in the camshaft 126 will pump fluid out of the portion of the recess 132a and allow the lobe 162a of vane 160 to move into the portion of the recess which has been emptied of hydraulic fluid. However, reverse movement of the vane will not occur as the torque pulsations in the camshaft become oppositely directed unless and until the spool 200 moves to the left, because of the blockage of fluid flow through the return line 196 by the land 200b of the spool 200. While illustrated as a separate closed passage in FIG. 19, the periphery of the vane 160 has an open oil passage slot, element 160c in FIGS. 10, 11, 15, 16 and 17, which permits the transfer of oil between the portion of the recess 132a on the right side of the lobe 160a and the portion of the recess 132b on the right side of the lobe 160b, which are the non-active sides of the lobes 160a, 160b; thus, counterclockwise movement of the vane 160 relative to the sprocket 132 will occur when flow is permitted through return line 194 and clockwise movement will occur when flow is permitted through return line 196.

Further, the passage 182 is provided with an extension 182a to the non-active side of one of the lobes 160a, 160b, shown as the lobe 160b, to permit a continuous supply of make-up oil to the non-active sides of the lobes 160a, 160b for better rotational balance, improved damping of vane motion, and improved lubrication of the bearing surfaces of the vane 160. It is to be noted that the supply of make-up oil in this manner avoids the need to route the make-up oil through the solenoid 206. Thus, the flow of make-up oil does not affect, and is not affected by, the operation of the solenoid 206. Specifically make-up oil will continue to be provided to the lobes 160a, 160b in the event of a failure of the solenoid 206, and it reduces the oil flow rates that need to be handled by the solenoid 206.

The elements of the structure of FIGS. 10-18 which correspond to the elements of FIG. 19, as described above, are identified in FIGS. 10-18 by the reference numerals which were used in FIG. 19, it being noted that the check valves 184 and 186 are disc-type check valves in FIGS. 10-18 as opposed to the ball type check valves of FIG. 19. While disc-type check valves are preferred for the embodiment of FIGS. 10-18, it is to be understood that other types of check valves can also be used.

Figure 20:
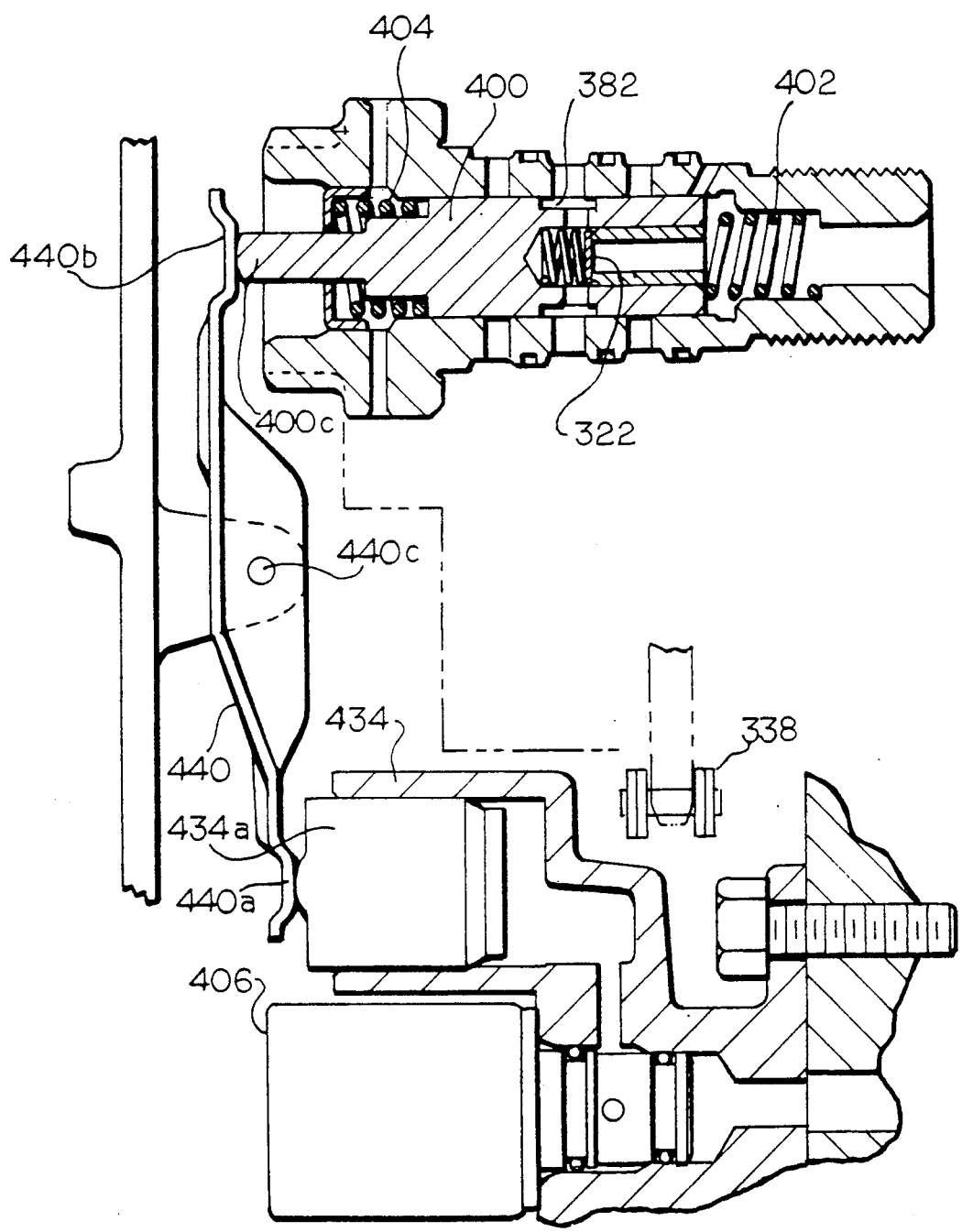
FIG. 20 is a fragmentary view similar to FIG. 12 of an alternative embodiment of a variable camshaft timing system.

FIG. 20 illustrates a modification of the embodiment of FIGS. 10-18. The elements of FIG. 20 which correspond in structure and function to the elements of FIGS. 10-18 are identified by a 300 series or a 400 series numeral, the last two digits of which correspond to the last two digits of the embodiment of FIGS. 10-18. In the embodiment of FIG. 20, the piston 434a is not aligned with the spool 400 and is incapable of bearing against its exposed free end 400c. Rather, the piston 434a acts an end 440a of a lever arm 440, an opposite end 440b of which bears on the free end 400c of the spool. The lever arm 440 is pivoted at a location 440c between its ends, for example at a location on the engine block or on a housing attached thereto, to function as a first class lever. The embodiment of FIG. 20, thus, is somewhat shorter in axial length, along the axis of the associated camshaft, and this is an advantage in adapting the variable camshaft timing system of the present invention to some vehicle/engine configurations.

Figure 21:
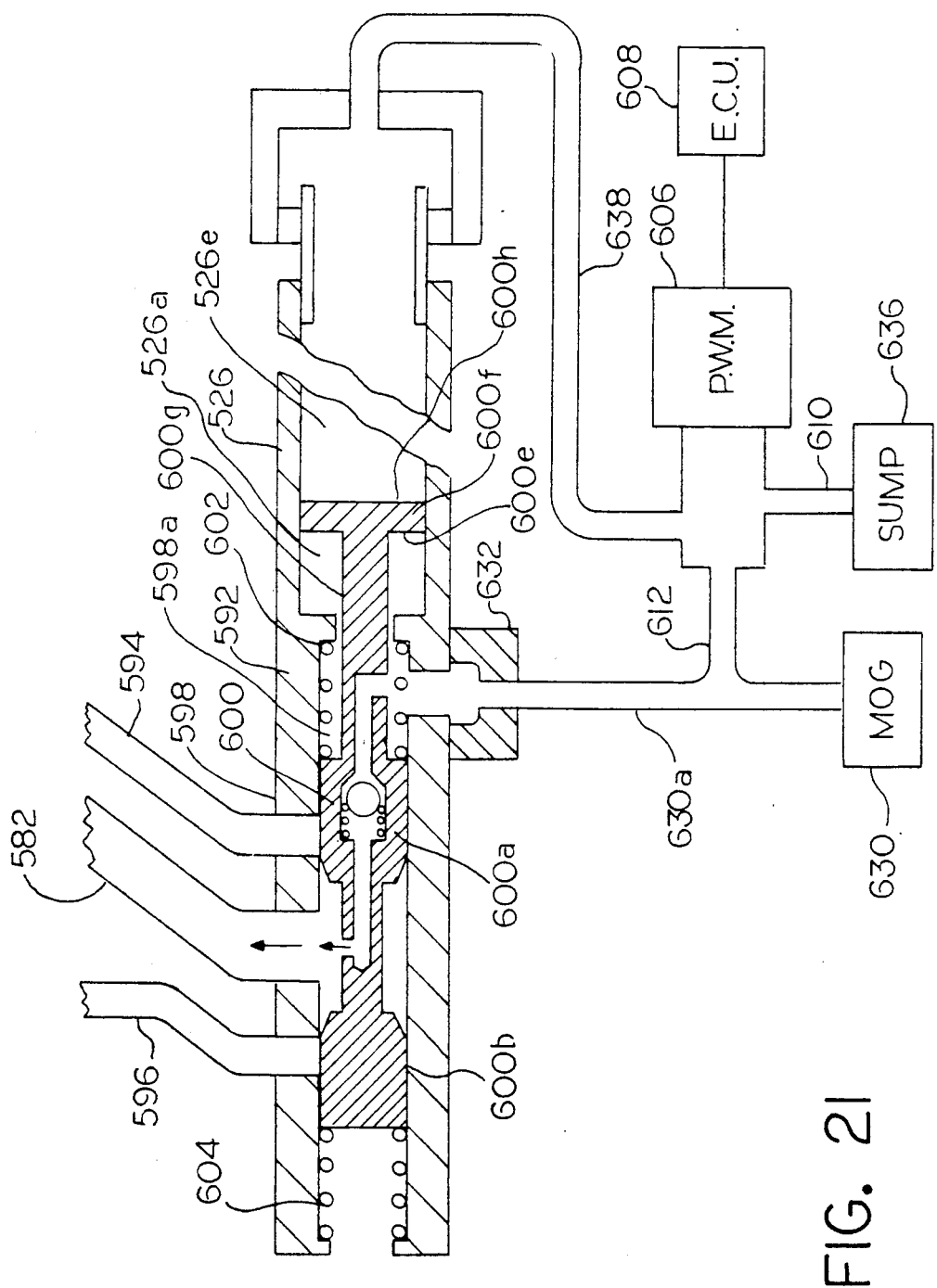
FIG. 21 is a fragmentary schematic view similar to FIG. 19 of an alternative embodiment of the present invention.

FIG. 21 schematically illustrates a modification of the arrangement of FIG. 19. The elements of FIG. 21 which correspond in structure and function to the elements of FIG. 19 are identified by a 500 series numeral or a 600 series numeral, the last two digits of which correspond to the last two digits of the embodiment of FIG. 19.

In the embodiment of FIG. 21 there is provided a spool valve 592 which is actually an extension of a camshaft 526. In this way all applicable hydraulic fluids are kept within the camshaft 526. This arrangement minimizes the required external dimensional requirements relative to those of other embodiments of the invention, and this is especially important in engine and vehicle configurations wherein space within an engine compartment longitudinally of the camshaft is particularly limited. Thus, in the embodiment of FIG. 21, the spool valve 592 is made up of a cylindrical portion 598 of the camshaft 526 and a spool 600 which is slidable to and fro within the portion 598. The spool 600 has cylindrical lands 600a and 600b on opposed ends thereof, and the lands 600a and 600b, which fit snugly within the portion 598, are positioned so that the land 600b which is slidable to and fro within the portion 598. The spool 600 has cylindrical lands 600a and 600b on opposed ends thereof, and the lands 600a and 600b, which fit snugly within the portion 598, are positioned so that the land 600b will block the exit of hydraulic fluid from the return line 596, or the land 600a will block the exit of hydraulic fluid from the return line 594, or the lands 600a and 600b will block the exit of hydraulic fluid from both the return lines 594 and 596, as is shown in FIG. 21, where the camshaft 526 is being maintained in a selected intermediate position relative to the crankshaft of the associated engine.

The position of the spool 600 within the member 598 is influenced by an opposed pair of springs 602, 604 which act on the ends of the lands 600a, 600b, respectively. Thus, the spring 602 resiliently urges the spool 600 to the left, in the orientation illustrated in FIG. 21, and the spring 604 resiliently urges the spool 600 to the right in such orientation. The position of the spool 600 within the portion 598 is further influenced by a supply of pressurized hydraulic fluid within a subportion 598a of the portion 598, on the outside of the land 600a, which urges the spool 600 to the left. The subportion 598a of the portion 598 receives its pressurized fluid (engine oil) directly from the main oil gallery ("MOG") 630 of the engine by way of a conduit 230a, and this oil is also used to lubricate a bearing 632 in which the camshaft 526 of the engine rotates.

The hydraulic fluid within the subportion 598a, which is at full system pressure, acts on the end of the land 600a of the spool 600 to urge the spool 600 to the left, in the configuration illustrated in FIG. 21. However, the hydraulic fluid within the subportion 598a is permitted to bleed into an otherwise closed, interior portion 526a of the camshaft 526 where it acts on a surface 600e of a transversely extending portion 600f of an extension 600g of the spool 600. Since the exposed surface area of the surface 600e is greater than the exposed surface area of the end of the land 600a, the net effect of the hydraulic fluid entering the subportion 598a from the main oil gallery 630 is to urge the spool 600 to the right in the FIG. 21 configuration.

In the illustrated position of the spool 600 in FIG. 21, the hydraulic forces which urge the spool 600 to the right, as explained above, are balanced by hydraulic forces within another portion 526e of the camshaft 526 which act on an opposed surface 600h of the extension 600g of the spool 600. Since the surface area of the surface 600h is greater than that of the surface 600e, nominally twice as great, the spool 600 will be centered in its null position by the springs 602, 604 when the hydraulic pressure within the portion 526e is less than the hydraulic pressure within the portion 526a. The hydraulic pressure within the portion 526e is controlled by a solenoid 606, preferably of the pulse width modulated type (PWM), in response to a control signal from an electronic engine control unit (ECU) 608, shown schematically, which may be of conventional construction. With the spool 600 in its null position when the pressure in the portion 526e is equal to some predetermined ratio of the pressure in the portion 526d, the on-off pulses of the solenoid 606 will be of equal duration; by increasing or decreasing the on duration relative to the off duration, the pressure in the portion 526e will be increased or decreased relative to such predetermined ratio, thereby moving the spool 600 to the left or to the right, respectively. The solenoid 606 receives engine oil from the engine oil gallery 630 through an inlet line 612 and selectively delivers engine oil from such sources to the portion 526e through a supply line 238. Excess oil from the solenoid 606 is drained to a sump 636 by way of a line 610.

The embodiment of FIG. 21 is also especially well suited for use in a belt driven variable camshaft timing system, because it is usually highly desirable that the belts and pulleys and other belt contacting elements in such a system be operated in a dry, unlubricated condition. This is relatively easy to accomplish with the embodiment of FIG. 21 because all hydraulic fluids are maintained within the interior of the camshaft 526, thereby eliminating the need for complex sealing arrangements at an end thereof.

Although the best mode contemplated by the inventors for carrying out the present invention as of the filing date hereof has been shown and described herein, it will be apparent to those skilled in the art that suitable modifications, variations, and equivalents may be made without departing from the scope of the invention, such scope being limited solely by the terms of the following claims.

What is claimed is:

1. In an internal combustion engine having a rotatable crankshaft and a rotatable camshaft, the camshaft being position variable in a circumferential direction relative to the crankshaft, means for varying the position of the camshaft relative to the crankshaft, said means for varying comprising a source of hydraulic fluid under pressure, a first hydraulic operator connected to said crankshaft and to said camshaft, the operation of said first hydraulic operator being effective to vary the position of the camshaft relative to the crankshaft in a given circumferential direction, first conduit means for delivering hydraulic fluid from the source to the first hydraulic operator to operate the first hydraulic operator, a second hydraulic operator connected to said crankshaft and to said camshaft, the operation of said second hydraulic operator being effective to vary the position of the camshaft relative to the crankshaft in an opposed circumferential direction, second conduit means for exhausting hydraulic fluid from the first hydraulic operator, third conduit means for delivering hydraulic fluid from the source to the second hydraulic operator to operate the second hydraulic operator, fourth conduit means for exhausting hydraulic fluid from the second hydraulic operator and control means for controlling the exhausting of hydraulic fluid from the first hydraulic operator and the second hydraulic operator to selectively permit hydraulic fluid from the source to operate one or another of said first hydraulic operator and said second hydraulic operator, said control means comprising:

a spool valve in communication with said second conduit means and said fourth conduit means, said spool valve comprising a housing and a valve member, said valve member being reciprocable within said housing and comprising first and second opposed ends and first and second spaced apart lands between said opposed ends, said first land being capable of blocking flow through said second conduit means in first and third positions of said valve member and permitting flow through said second conduit means in a second position of said valve member, said second land being capable of blocking flow through said fourth conduit means in said first and second positions of said valve member and permitting flow through said second conduit means in said third position of said valve member;

fifth conduit means for transmitting hydraulic pressure from the source to act on a first surface of said valve member at substantially the pressure of the source to urge the valve member in a given direction;

force imposing means for imposing a load on said valve member to urge said valve member in an opposed direction, said force imposing means having a second surface with an area that is substantially greater than the area of said first surface;

sixth conduit means for transmitting hydraulic pressure from the source to the force imposing means to act on said second surface of said force imposing means, said sixth conduit means comprising a control member therein to controllably reduce the pressure of the source that acts on said second surface of said force imposing means; and centering means for centering said valve member in a substantially fixed position relative to said housing when the hydraulic forces acting on said valve member are in balance.

2. An internal combustion engine according to claim 1 wherein said force imposing means comprises an hydraulic piston, wherein one of said first surface and said second surface is an end of said valve member, and wherein the other of said first surface and said second surface is a surface of said hydraulic piston.

3. An internal combustion engine according to claim 2 wherein said hydraulic piston is positioned in alignment with said other of the opposed ends of said valve operator.

4. An internal combustion engine according to claim 2 wherein said hydraulic piston is positioned out of alignment with said other of the opposed ends of said valve operator, and further comprising first class lever means for transmitting a load from said hydraulic piston to said other of the opposed ends of said valve operator.

5. An internal combustion engine according to claim 1 wherein said control member comprises a pulse width modulated solenoid.

6. An internal combustion engine according to claim 2 wherein said control member comprises a pulse width modulated solenoid.

7. An internal combustion engine according to claim 6 wherein the area of said surface of said hydraulic piston is substantially equal to a multiple of 2.0 of the surface area of said one of the ends of said valve operator, and wherein said valve member remains in said first position when said pulse width modulated solenoid operates on a 50% duty cycle to reduce the pressure from the source that acts on the area of said surface to substantially 50% of the pressure of the source.

8. An internal combustion engine according to claim 7 wherein said centering means comprises first and second compression spring members acting, respectively, on said first and second opposed ends of said valve member, said first and second compression spring members imposing oppositely directed loads on said first and second opposed ends, said oppositely directed loads being substantially equal in magnitude when said valve member is in said first position.

9. An internal combustion engine according to claim 2 wherein said valve member further comprises a portion between said first and second lands, said portion defining an hydraulic fluid flow passage with said housing of said spool valve; wherein said control means further comprises seventh conduit means in communication with said hydraulic fluid flow passage in each of said first, second and third positions of said valve member and with said first conduit means and said third conduit means, said seventh conduit means permitting the flow of hydraulic fluid from said hydraulic fluid flow passage to said first hydraulic operator and said second hydraulic operator, whereby hydraulic fluid being exhausted from one of said first hydraulic operator and said second hydraulic operator will be returned to the other of said first hydraulic operator and said second hydraulic operator without returning to the source of hydraulic fluid.

10. An internal combustion engine according to claim 9 and further comprising check valve means for preventing flow of hydraulic fluid from said first hydraulic operator and said second hydraulic operator through said first conduit means and said third conduit means into said seventh conduit means.

11. An internal combustion engine according to claim 9 wherein said valve member has an internal passage for permitting flow of hydraulic fluid from the source of hydraulic fluid through said valve member from said one of the opposed ends to said hydraulic fluid flow passage, said internal passage having internal passage check valve means for preventing flow from said hydraulic fluid flow passage back through said internal passage.

12. An internal combustion engine according to claim 1 wherein the hydraulic fluid under pressure is engine lubricating oil.

13. An internal combustion engine according to claim 5 wherein the camshaft is subject to torque reversals driving the operation thereof and wherein the exhaust of hydraulic fluid from the first and second hydraulic operators occurs selectively in reaction to the direction of torque in the camshaft.

14. An internal combustion engine according to claim 6 and further comprising:
an engine control unit responsive to at least one engine operating condition for controlling the operation of the pulse width modulated solenoid to selectively increase or decrease the hydraulic pressure acting on said surface of said hydraulic piston; and thereby change the position of the valve member within the housing of the spool valve.

15. An internal combustion engine according to claim 1 wherein said valve member further comprises an extension extending beyond one of the ends thereof, and wherein one of said first surface and said second surface is a surface on said extension and extends generally parallel to said one of the ends.

* * * * *